May 12, 1964   JEAN-CLAUDE METTETAL ETAL   3,132,517
APPARATUS FOR THE MEASUREMENT OF TEMPERATURES
BY THERMO-COUPLE CONTACTS
Filed Dec. 14, 1960   4 Sheets-Sheet 1
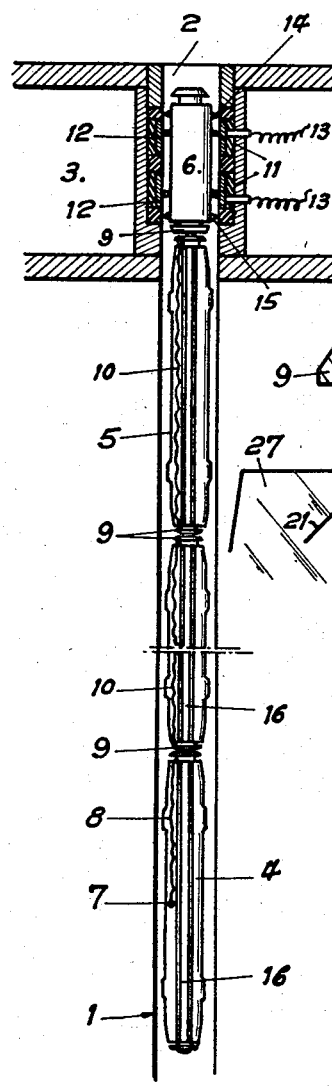
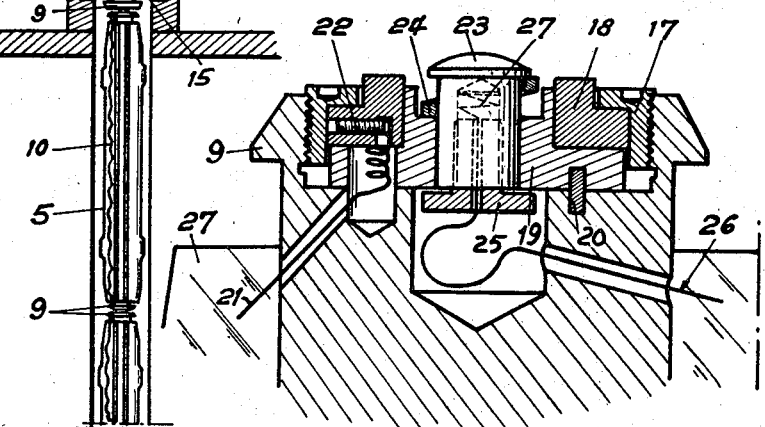
INVENTORS.
GEORGES FRITZ
JEAN-CLAUDE METTETAL
BY
Woodhams Blanchard and Flynn
ATTORNEYS

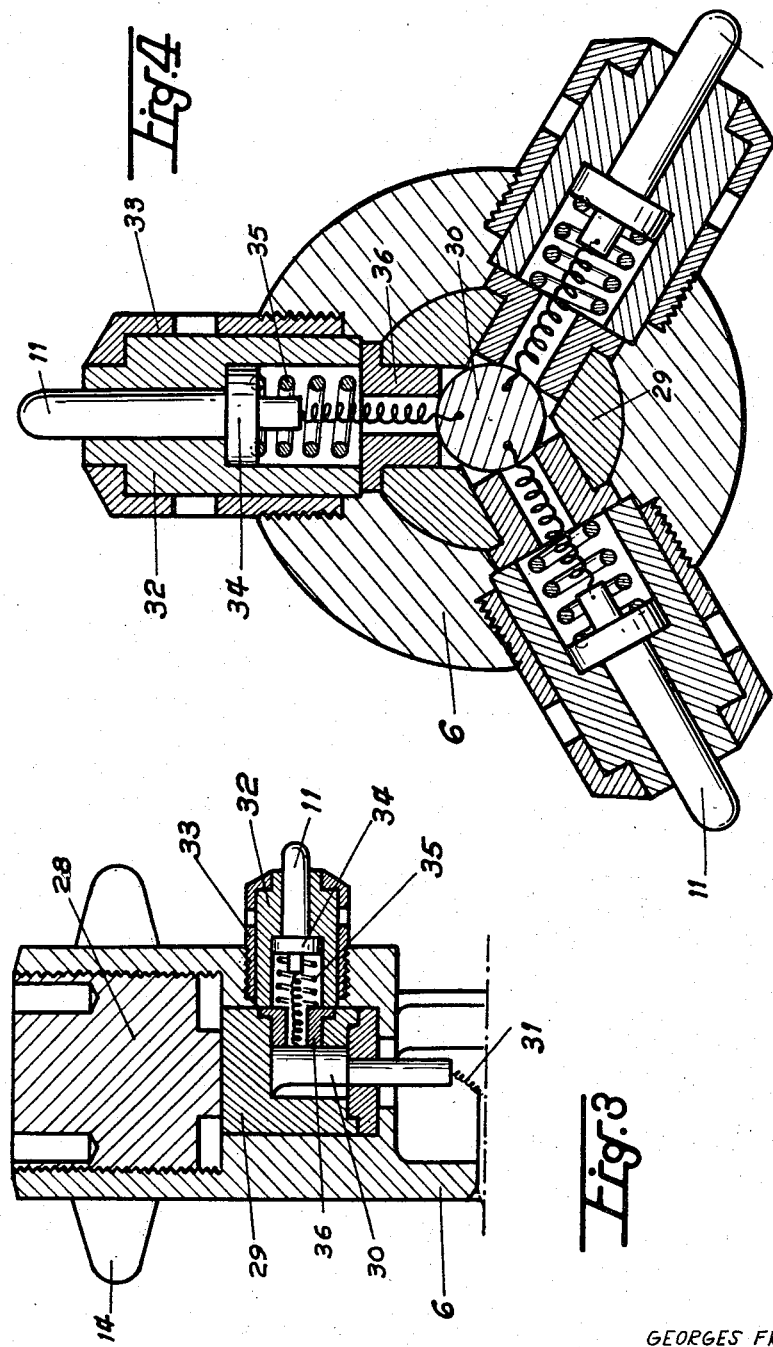

May 12, 1964   JEAN-CLAUDE METTETAL ETAL   3,132,517
APPARATUS FOR THE MEASUREMENT OF TEMPERATURES
BY THERMO-COUPLE CONTACTS
Filed Dec. 14, 1960                           4 Sheets-Sheet 3
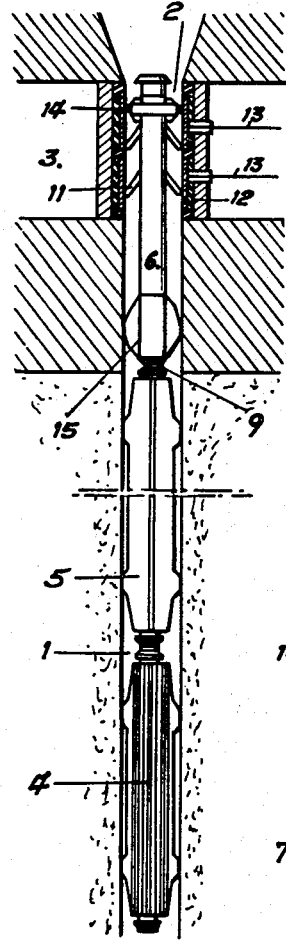
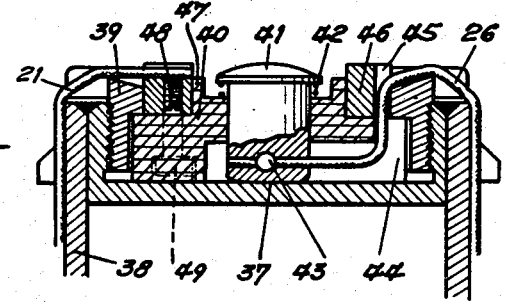
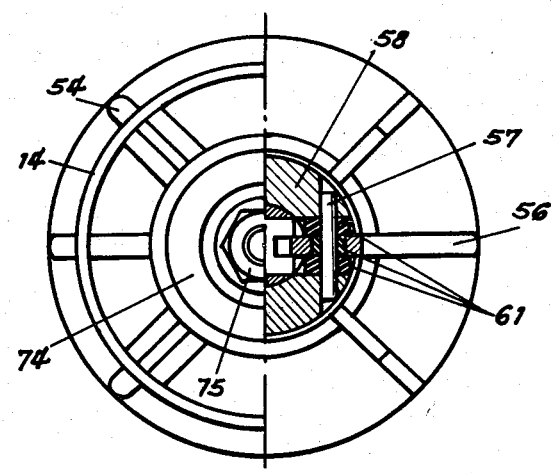
INVENTORS.
GEORGES FRITZ
JEAN-CLAUDE METTETAL
BY
ATTORNEYS

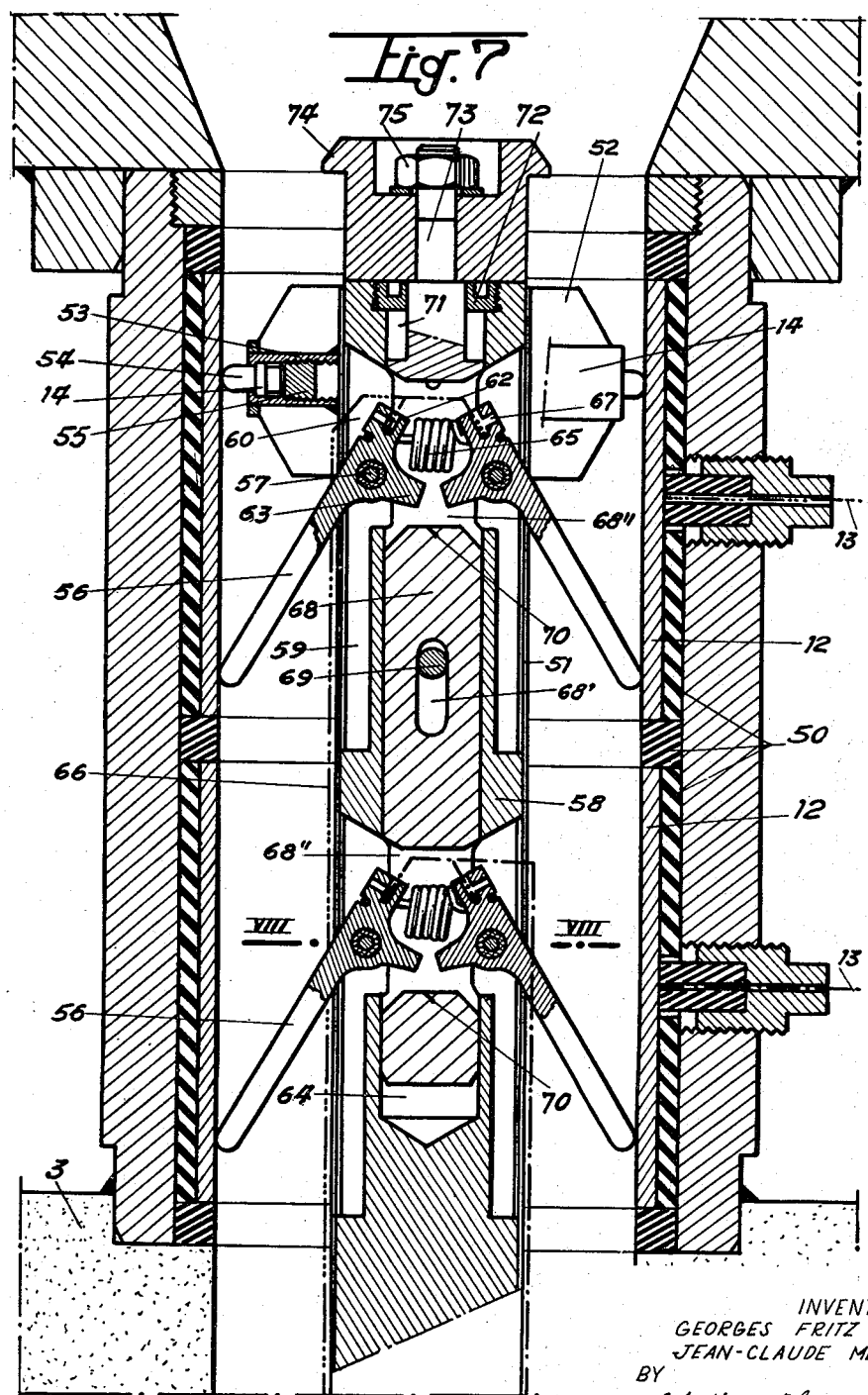

United States Patent Office 3,132,517
Patented May 12, 1964

3,132,517
APPARATUS FOR THE MEASUREMENT OF TEMPERATURES BY THERMO-COUPLE CONTACTS
Jean-Claude Meffetal and Georges Fritz, Paris, France, assignors to Electricite de France—Service National, Paris, France, a French organization
Filed Dec. 14, 1960, Ser. No. 75,755
Claims priority, application France Dec. 17, 1959
15 Claims. (Cl. 73—359)

The present invention relates to an apparatus for the measurement of temperatures by means of thermo-couple contacts.

One of the objects of the invention is to produce an apparatus designed to permit of measurements of this kind within the interior of a chamber which is accessible only through one or a number of passages, such as an industrial furnace or an atomic reactor.

Another object of the invention is to make such measurements possible at different levels in the passages which find access into the chamber.

A further object of the invention, which is more especially advantageous when the chamber which is difficult to reach is constituted by the core of an atomic reactor, is to create an apparatus in which the conductors are not continuous between the welded junction and the measuring instrument, but on the contrary, are cut away from point to point.

Lastly, yet another object of the invention is to create an apparatus, the elements of which are designed to contain members other than those necessary for measurement purposes, for example the radio-active rods introduced in the passages of an atomic reactor.

These objects, as well as other purposes which will be brought out by the description which follows below, are carried into effect in accordance with the present invention by means of an apparatus which is essentially characterized in that the said apparatus is composed of a measuring sheath containing a welded junction between two metals or alloys designed to produce a thermo-electric couple, a certain number of intermediate sheaths and an output sheath provided with two contact-studs designed to be connected to a measuring apparatus, the measuring sheath and the output sheath being provided at one of their extremities—and the intermediate sheaths at both extremities—with contactor caps fitted with two terminal contacts adapted to establish a contact with the two corresponding terminal contacts of another cap, the terminal contacts of the cap on the measuring sheath being connected to the welded junction, while the terminal contacts of the caps on the intermediate sheaths are connected to each other, and the terminal contacts of the cap on the output sheath are connected to the output contact-studs, all the contacts and conductors of each line between the welded junction and the measuring apparatus being constituted by a same metal or alloy of the thermo-electric couple.

It can be seen that there is thus obtained an apparatus which makes it possible to introduce into the passage in which the measurement is intended to be effected, first a measuring sheath, then in succession thereto, the desired number of intermediate sheaths, followed lastly by the output sheath. There is thus obtained a continuous connection between the welded junction and the measuring apparatuses, through the conductors in the interior of the sheaths, through the caps and through the output contact-studs of the output sheath.

Furthermore, this apparatus meets the condition required to produce a circuit so designed as to provide a correct thermo-electric measurement, inasmuch as two continuous lines are formed by a same metallic element from the welded junction to the measuring apparatus. It will be understood that the insulators employed for the sheaths, the caps and the terminal contacts will be adapted to suit the circumstances of measurement and made so as to withstand, for example, high temperatures, radiations and gaseous atmospheres which can be present.

Each of the caps is preferably constituted by an insulating annular member in which is fitted a conductive ring constituting one of the terminal contacts, and a central contact-stud moving in parallel relation to the axis of the cap, and which is drawn towards its outer position by an elastic member. The circular terminal contact and the central contact-stud are each made of a suitable metal and connected by means of wires of the same metal, either to the corresponding contact of the oppositely facing cap, or to the welded junction, or to an output contact-stud.

As regards the output sheath, this latter comprises, in accordance with an improvement made in the present invention, two series of contacts moving radially and thrust back towards the exterior by an elastic member, each of the said series co-operating with a cylindrical ring provided in the passage, both cylindrical rings being connected to the measuring apparatus. For purposes of isolation, it is also possible to provide the output sheaths with annular members which are brought to bear against the periphery of the passage and which are constituted by a suitable insulating material. Depending on the applications, the said annular members can also be replaced by simple bulges for guiding and supporting purposes.

In a form of embodiment of the invention which is more especially adapted to the measurements of temperatures in a nuclear reactor, the sheaths are those employed to contain the radioactive rods and are provided for this purpose with an axial housing.

In accordance with a first improvement, the conductors, which terminate in the conductive ring and in the central contact-stud of each of the caps and extend along the sheath, pass round the extremity of the said sheath, the first conductor leading directly by the exterior to the conductive ring, while the second conductor passes through the insulating annular member and is then fixed to the movable central contact-stud.

By virtue of this improvement, the conductors no longer pass through the sheath in any way, thereby permitting the said sheath as well as the shielding with which it may be provided to be kept intact, as must be the case when the said sheath contains a radioactive element.

In accordance with a further improvement, the movable contact-studs are constituted by feeler arms pivotally mounted on the output sheath and drawn outwards by means of an elastic member, means being provided to bring back the said feeler arms into a housing provided for this purpose in the sheath when this latter is suspended.

This arrangement is particularly effective as a means for ensuring reliable and easy handling of the output sheath which, as it is known, must in the case of atomic reactors pass through a long sequence of passages which are frequently non-rectilinear.

In a preferred form of embodiment, each series of contacts comprises two feeler arms moving in a same diametral plane of the sheath, while a same elastic member acts upon the extremities of the feeler arms which extend away from their point of pivotal attachment, so as to draw one extremity towards the other.

As regards the means for bringing back the feeler arms into their housings, such means are preferably constituted by an axial piston which, by its own weight, takes up a low position and is designed to be brought up to a high position when the sheath is suspended, while during this movement, certain surfaces of the piston act upon the noses of the feeler arms in such manner as to ensure the displacement of the said feeler arms towards the retracted position.

It is preferably ensured that the piston passes out of the sheath at the upper portion thereof and carries the head by which the sheath must be gripped. By virtue of this arrangement, when the sheath is suspended for the purpose of being introduced, withdrawn or otherwise manipulated, the piston first carries out its upward movement, thereby ensuring the movement of withdrawal of the feeler arms, following which the complete unit can be moved, since the feeler arms are in the retracted or withdrawn position.

The surfaces which act upon the noses of the feeler arms can easily be constituted by forming in the piston transverse bores in which the said noses together with the elastic members and the extremities of the feeler arms are housed. The piston then comes into action through the bottom wall of the said bores.

The sheath is preferably provided with an abutment which co-operates with a shoulder of the piston so as to limit the upward movement of this latter with respect to the sheath. It is by means of this abutment that the suspension of the sheath is ensured in dependence on the piston.

The present invention will in any case be clearly understood with reference to the description which follows below, reference being made to the accompanying drawings which show by way of example without any limitation being implied, a form of embodiment of the invention, and in which:

FIG. 1 is a diagrammatic view of an apparatus in accordance with the invention;

FIG. 2 shows in cross-section, on a larger scale, one of the caps employed;

FIG. 3 shows in partial cross-section an output sheath;

FIG. 4 is a transverse cross-section of the same output sheath on a larger scale.

FIG. 5 is a diagrammatic view of an apparatus in accordance with the present invention;

FIG. 6 shows a cross-section on a larger scale, of one of the caps employed in this apparatus;

FIG. 7 shows in cross-section, also on a larger scale, the output sheath in its orifice; and FIG. 8 illustrates a view of the same sheath partially seen from above and partially in cross-section taken along the line VIII—VIII of FIG. 7.

Reference being made to FIG. 1, it can be seen that by proposing to carry out a measurement of temperature inside a chamber which can be reached only through a passage 1 comprising an inlet orifice 2 which passes through an isolating wall 3, there is introduced in the passage a measuring sheath 4, a certain number of intermediate sheaths 5 and an output sheath 6. The measuring sheath is provided with a welded junction 7 between two metals or alloys designed to produce a thermo-electric couple, for example iron and constantan. This welded junction is connected by means of two conductors 8, each conductor being of one of the metals or alloys of the said welded junction, to a cap 9 fitted on the sheath 4; similarly, each of the intermediate sheaths 5 is provided at each of its extremities with a cap 9, the said caps of each sheath being connected by conductors 10 having the same composition as the preceding conductors. Finally, the output sheath 6 is also provided with a cap 9, the terminal contacts of which are connected to output contact-studs 11 again by means of wires having the same composition. The output contact-studs 11 are disposed in two superimposed planes and are in contact with cylindrical rings 12 provided on the periphery of the passage, the said cylindrical rings being in turn connected to the measuring apparatus by means of conductors 13 which again have the same composition. The output sheath is additionally provided with isolating and packing rings or bulges 14—15 applied against the periphery of the tunnel.

If due care has been taken to make the terminal contacts of the various caps and of the output sheath of the same metal or alloy as the conductors which lead to the said terminal contacts, there is thus obtained a line 8—9—10—11—12—13 which connects the welded junction 7 to the measuring apparatus, each length of which is constituted by an unbroken sequence of conductors of a same metal or alloy. It is thus possible to carry out a measurement of the temperature at the level of the welded junction 7 without thereby causing the conditions existing between the said welded junction and the outlet to have the slightest influence on the measurement. Furthermore, by varying the number of intermediate sheaths 5, it is possible to carry out measurements of temperature at any desired point in the passage 1. Lastly, the bores 16 of the sheaths are capable of containing any elements or devices other than those indicated above. In particular, in the example illustrated in FIG. 1, the passage 1 constitutes one of the passages of an atomic reactor in which are introduced sheaths of the type designated by the reference 4—5 containing a radioactive rod. At the moment of starting up the reactor, a choice is fixed on a certain number of passages in which sheaths of the type designated by the reference 4, above which are mounted sheaths of the type shown at 5, are introduced at predetermined levels, while all the other sheaths disposed beneath the said sheaths shown at 4 and 5 and inside the other passages are of the conventional type.

If reference is now made to FIG. 2, there can be seen a cap 9 which is adapted to be mounted at the extremity of the sheath 4, at the two extremities of the sheaths 5, or at the extremity of the sheath 6. A cap of this type is essentially composed of a ring 17 of insulated material screwed into the material which constitutes the sheath, while the pressure applied by an annular flange formed on the said ring 17 ensures the fixation of a circular ring 18 forming a terminal contact which is applied against an internal ring 19, also of insulating material, this latter being anchored at 20 in the material constituting the sheath.

There can be seen at 21 one of the wires leading to the terminal contact 18 through a passage pierced in the sheath, the fixation of the said wire being effected by means of a screw 22. In the ring 19 is formed an axial bore in which a contact-stud 23 is adapted to move, the said contact-stud being drawn towards the exterior by means of a spring 24 and in which is screwed an end-piece 25 on which is formed an annular flange forming an abutment. The end-piece 25 provides a passage for the wire 26 which is fixed at 27 in the interior of the contact-stud. It can be seen that when two caps of the type designated by the reference 9 are disposed oppositely facing each other, a slight pressure has the result of bringing into contact the two terminal contacts of the type designated by the reference 18, after establishing contact between the two contact-studs of the type shown at 23 which have been withdrawn in opposition to springs 24. The fins with which the sheaths employed in atomic reactors are usually provided have been illustrated at 27.

FIGS. 3 and 4 show the output sheath 6 fitted with its annular members or bulges 14 and its two series of contact-studs 11. A threaded cap 28 permits the introduction in the sheath of a socket 29 inside which is placed a contact 30 to which leads a wire 31. This contact 30 is connected to the contact-studs 11 fitted in radial sockets 32 which are retained by threaded caps 33. Each contact-stud is provided with an abutment flange 34 and is drawn towards the exterior by a spring 35 applied against an abutment 36 which is integral with the socket. The lower half of the output sheath comprises similar members and terminates in a cap of the type designated by the reference 9. It can be seen that when a sheath of this type has been introduced in the orifice 2, the said sheath being centered by means of the members 14, the contact-studs 11 are applied by the springs 35 against the concentric rings 12.

Reference being made to FIG. 5, there can again be seen a passage 1 comprising an inlet orifice 2 passing through an isolating wall 3. In the passage are arranged a measurement sheath 4, a certain number of intermediate sheaths 5 and an output sheath 6. As in the case of the other sheaths, the output sheath is provided with a cap 9 which will be described below in greater detail, output contact-studs 11 disposed in two superimposed planes and coming into contact with cylindrical rings 12, the said cylindrical rings being connected to the measuring apparatus by means of conductors 13. The sheaths are also provided with an annular member 14 and isolating and packing bulges 15 applied against the periphery of the tunnel.

The operation of the device has thus been explained in the foregoing description. A description in greater detail follows below with reference to one of the caps 9 fitted on the output sheath at the lower extremity thereof, on the intermediate sheaths at their two extremities and on the measuring sheath at the upper extremity thereof. Reference being made to FIG. 6, it can be seen that a cap of this type is housed in a cup 37 which is welded to the insulating shielding 38 of the sheath, the said cup 37 being provided with an internal thread in which is engaged a locking ring 39, one shoulder of which immobilizes an insulating ring 40. A movable contact-stud 41 is fitted axially in the ring 40 and is forced back towards the exterior by a spring 42. A threaded bore 43 permits the introduction of a screw by means of which the conductor 26, suitably stripped, is clamped in the contact-stud 41 and subsequently leads off through a passage bored in the ring 40 at 44 and through the recessed portion 45 of a circular ring 46 which forms the fixed terminal contact. The conductor is then incurved in order subsequently to follow a passage in the insulating ring 39 and then to rest against the shielding 38 of the sheath. The ring 46 is wedged between the locking ring 39 and a circular shoulder 47 of the ring 40. The said circular shoulder 47 is bored at 48 so as to permit the introduction of a screw serving to clamp the conductor 21 which then leads off and follows a path similar to that of the conductor 26.

There is additionally provided a certain number of screws 49 by means of which the ring 46 is fixed on the ring 40. It can be seen that the conductors 21 and 26 do not at any point pass through either the cup 37 or the shielding 38, which is particularly important if the sheath is intended to contain a radioactive rod. The cap which is illustrated in FIG. 6 also works in the same manner as the cap illustrated in FIG. 2.

If reference is now made to FIGS. 7 and 8, it can be seen that these latter illustrate an output sheath 6 which maintains a contact with the cylindrical rings 12, these latter being connected to the conductor 13 and insulated, both from each other and with respect to the general framework of the installation, by means of rings designated by the reference 50. The sheath, which is surrounded by a metallic tube 51, carries at its upper extremity the annular member 14 which is held in position by means of a certain number of fins 52, the central portion of which is reamed at 53 so as to serve as a housing for shouldered fingers 54 which are locked in position by means of nuts 55. The tube 51 is suitably cut-out so as to permit the passage of feeler arms 56 which are pivotally mounted on spindles 57 carried by the sheath body 58 which is in turn provided with housings 59 for the feeler arms. These longitudinal housings are enlarged at 60 in order to receive the pivotal mounting provided with three insulating rings 61, the upper extremity 62 of the feeler arms, and a nose 63 which extends substantially at right angles to the general direction of the feeler arm; the body 58 of the sheath is also pierced with an axial bore 64 in which is mounted the spring 65 which draws toward each other both the extremities 62 of the feeler arms and the noses thereof; the conductors 66 are passed into the interior of the enlargements 60 and of the bore 64 so as to be clamped in the extremities of the feeler arms by means of locking screws which are screwed into bores 67. Since each conductor is single and must not comprise any welded joint, a conducting bridge is preferably mounted between the two feeler arms. A piston 68 moves inside the bore 64 and a slotted portion 68' of the said piston cooperates with a pin 69 which is rigidly fixed to the sheath, so as to provide vertical guiding and to prevent any movement of rotation. The piston 68 is provided with transverse housings 68" at the level of the pivotal mountings of the feeler arms, while the bottom surfaces 70 of these bores or housings are adapted to co-operate with the noses 63 in the manner which will be described below.

A shoulder 71 of the piston co-operates with a locking nut 72 screwed into the sheath so as to limit the upward movements of the piston. In addition, the head 74 of the sheath which is locked by a nut 75 and which limits the downward movements of the piston is fitted on the piston-extremity 73 of smaller diameter. It will be understood that if an upward tractive effort is applied on the head 74, the piston is therefore also displaced upwards and, by means of the co-operation of the noses 63 and the surfaces 70, the movement of the said piston draws with it the feeler arms which come into position in the housings 59, this movement being effected in opposition to the action of the springs 65. When the surface 71 comes into abutment against the nut 72, the feeler arms are completely withdrawn and the sheath no longer has any external excrescence apart from the fingers 54 and the members 15 which are specially intended for guiding purposes. When suspended by its head 74, the sheath can thus follow a path in a passage of any desired shape or form, even comprising curved portions, without any troublesome occurrences having to be feared. During the downward movement of the sheath, the feeler arms 56 remain retracted until the time when the said sheath is brought to bear against an intermediate sheath of the type designated by the reference 5, the piston being then capable of moving downwards and thus permitting the feeler arms 56 to take up their active position by pressing against the rings 12.

It will be understood that the foregoing description of the present invention has been given only by way of example and not by way of limitation and that a number of modifications can be made in the invention without thereby departing either from the scope or the spirit of the invention.

What we claim is:
1. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheaths at both their extremities—with contactor caps fitted with terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other the terminal contacts of the cap on the measuring sheath being connected to the welded junction, the first terminal contacts and the second terminal contacts on the caps of the inter- mediate sheaths being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple.

2. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other the terminal contacts of the cap on the measuring sheath being connected to the welded junction, the first terminal contacts and the second terminal contacts on the caps of the intermediate sheaths being connected respectively to each other, and the terminal contacts of the cap on the output sheath being connected to the output contact-studs, all the contacts and conductors of each line between the welded junction and the measuring apparatus being constituted by a same metal or alloy of the thermo-electric couple, each of said caps being constituted by an insulating annular member in which is fitted a conductive ring constituting said second terminal contact, and by a central contact-stud constituting said first terminal contact, said contact-stud being movable in parallel relation to the axis of said cap, said central contact stud being drawn towards its external position by an elastic member.

3. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheaths at both their extremities—with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by a same metal or alloy of the thermo-electric couple, each of said caps being constituted by an insulating annular member in which is fitted a conductive ring constituting one of said terminal contacts, and by a central contact-stud moving in parallel relation to the axis of said cap, said central contact-stud being drawn towards its external position by an elastic member, in which apparatus the conductors terminating in the conductive ring and in the central contact-stud of each of said caps and leading along the sheath are passed round the extremity of said sheath, the first conductor leading directly by the exterior and terminating in the conductive ring and the second conductor passing through the insulating annular member so as to be fixed to said movable central contact-stud.

4. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other, the terminal contacts of the cap on the measuring sheath being connected to the welded junction, the first terminal contacts and the second terminal contacts on the caps of the intermediate sheaths being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple, the output sheath comprising two series of contacts moving radially and thrust back towards the exterior by an elastic member, each of said series co-operating with a cylindrical ring provided in the passage, the two cylindrical rings being connected to the measuring apparatus.

5. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other, the terminal contacts of the cap on the measuring sheath being connected to the welded junction, the first terminal contacts and the second terminal contacts on the caps of the intermediate sheath being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple, each of said caps being constituted by an insulating annular member in which is fitted a conductive ring constituting said second terminal contact, and by a central contact-stud constituting said first terminal contact, said contact-stud being movable in parallel relation to the axis of said cap, said central contact-stud being drawn towards its external position by an elastic member, the output sheath comprising two series of contacts moving radially and thrust back towards the exterior by an elastic member, each of said series cooperating with a cylindrical ring provided in the passage, the two cylindrical rings being connected to the measuring apparatus.

6. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other, the terminal contacts of the cap on the measuring sheath being connected to the welded junction, the first terminal contacts and the second terminal contacts on the caps of the intermediate sheaths being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple, said sheaths comprising a closed central chamber adapted to contain a radioactive rod, the conductors for each sheath being located outside of said chamber.

7. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other, the terminal contacts of the cap on the measuring sheath being connected to the welded junction, the first terminal contacts and the second terminal contacts on the caps of the intermediate sheaths being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple, each of said caps being constituted by an insulating annular member in which is fitted a conductive ring constituting said second terminal contact, and by a central contact-stud constituting said first terminal contact, said contact-stud being movable in parallel relation to the axis of said cap, said central contact-stud being drawn towards its external position by an elastic member, said sheaths comprising a closed central chamber adapted to contain a radioactive rod, the conductors for each sheath being located outside of said chamber.

8. An apparatus for the measurement of temperatures by means of thermo-couple contacts permitting of measurements in the the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other, the terminal contacts of the cap on the measuring sheath being connected to the welded junction, the first terminal contacts and the second terminal contacts on the caps of the intermediate sheaths being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple, the output sheath comprising two series of contacts moving radially and thrust back towards the exterior by an elastic member, each of said series cooperating with a cylindrical ring provided in the passage, the two cylindrical rings being connected to the measuring apparatus, said sheaths comprising a closed central chamber adapted to contain a radioactive rod, the conductors for each sheath being located outside of said chamber.

9. An apparatus for the measurement of temperatures by means of thermo-couple contacts permitting of measurements in the the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, said terminal contacts in each contactor cap including a first, centrally located, terminal contact and a second terminal contact spaced radially and insulated from said first terminal contact, the first terminal contacts and the second terminal contacts in adjacent contactor caps being respectively in axial alignment so that they can be brought into engagement with each other by an axial movement of said contactor caps toward each other, the terminal contacts of the cap on the measuring sheath being connected to the welded junction, the first terminal contacts and the second terminal contacts on the caps of the intermediate sheaths being respectively connected to each other, and the terminal contacts of the cap on the output sheath being connected to the output contact-studs, all the contacts and conductors of each line between the welded junction and the measuring apparatus being constituted by a same metal or alloy of the thermo-electric couple, each of said caps being constituted by an insulating annular member in which is fitted a conductive ring constituting said second terminal contact, and by a central contact-stud constituting said first terminal contact, said contact-stud being movable in parallel relation to the axis of said cap, said central contact-stud being drawn towards its external position by an elastic member, each of said series co-operating with a cylindrical ring provided in the passage, the two cylindrical rings being connected to the measuring apparatus, said sheaths comprising a closed central chamber adapted to contain a radioactive rod, the conductors for each sheath being located outside of said chamber.

10. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheaths at both their extremities—with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by a same metal or alloy of the thermo-electric couple, said output contact-studs being constituted by feeler arms pivotally mounted on said output sheath and drawn outwards by an elastic member, means being provided to bring back said feeler arms into a housing formed in the sheath for this purpose when said sheath is suspended.

11. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheaths at both their extremities—with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by the same metal or alloy of the thermo-electric couple, said output contact-studs being constituted by feeler arms pivotally mounted on said output sheath and drawn upwards by an elastic member, means being provided to bring back said feeler arms into a housing formed in the sheath for this purpose when said sheath is suspended, each series of contacts comprising two feeler arms moving in a same diametral plane of the sheath, a same elastic member acting upon the extremities of said feeler arms projecting from the point at which said arms are pivotally attached in order to draw one extremity towards the other.

12. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities— and the intermediate sheaths at both their extremities— with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by a same metal or alloy of the thermo-electric couple, said output contact-studs being constituted by feeler arms pivotally mounted on said output sheath and drawn outwards by an elastic member, means being provided to bring back said feeler arms into a housing formed in the sheath for this purpose when said sheath is suspended, said means for bringing back said feeler arms into their housings being constituted by an axial piston which, by means of its own weight, takes up a low position and is designed to be brought up to a high position when said sheath is suspended, surfaces of said piston being adapted to act, during this movement, upon the noses of said feeler arms in order to ensure the displacement of said feeler arms towards the retracted position.

13. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheath at both their extremities—with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by a same metal or alloy of the thermo-electric couple, said output contact-studs being constituted by feeler arms pivotally mounted on said output sheath and drawn outwards by an elastic member, means being provided to bring back said feeler arms into a housing formed in the sheath for this purpose when said sheath is suspended, said means for bringing back said feeler-arms into their housings being constituted by an axial piston which, by means of its own weight, takes up a low position and is designed to be brought up to a high position when said sheath is suspended, surfaces of said piston being adapted to act, during this movement, upon the noses of said feeler arms in order to ensure the displacement of said feeler arms towards the retracted position, said piston passing out of the sheath at the top portion of said sheath and carrying the head by which said sheath must be gripped.

14. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheaths at both their extremities—with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by a same metal or alloy of the thermo-electric couple, said output contact-studs being constituted by feeler arms pivotally mounted on said output sheath and drawn outwards by an elastic member, means being provided to bring back said feeler arms into a housing formed in the sheath for this purpose when said sheath is suspended, said means for bringing back said feeler arms into their housings being constituted by an axial piston which, by means of its own weight, takes up a low position and is designed to be brought up to a high position when said sheath is suspended, surfaces of said piston being adapted to act, during this movement, upon the noses of said feeler arms in order to ensure the displacement of said feeler arms towards the retracted position, said surfaces acting upon said noses being constituted by transverse bores which are formed in said piston and in which are housed said noses, the elastic members, and the extremities of said feeler arms.

15. An apparatus for the measurement of temperatures by means of thermo-couple contacts permitting of measurements in the interior of a chamber which is accessible only through one or a number of passages, said apparatus being composed of a measuring sheath containing a welded junction between two metals or alloys designed to produce a thermo-electric couple, a certain number of intermediate sheaths and an output sheath provided with two contact-studs designed to be connected to a measuring apparatus, said measuring sheath and said output sheath being provided at one of their extremities—and the intermediate sheaths at both their extremities—with contactor caps fitted with two terminal contacts designed to establish a contact with the two corresponding terminal contacts of another cap, the terminal contacts of the cap on the measuring sheath being connected to the welded junction, the terminal contacts on the caps of the intermediate sheaths being connected to each other, and the terminal contacts of the cap on the output sheath being connected to the output contact-studs, all the contacts and conductors of each line between the welded junction and the measuring apparatus being constituted by a same metal or alloys of the thermo-electric couple, said output contact-studs being constituted by feeler arms pivotally mounted on said output sheath and drawn outwards by an elastic member, means being provided to bring back said feeler arms into a housing formed in the sheath for this purpose when said sheath is suspended, said means for bringing back said feeler arms into their housings being constituted by an axial piston which, by means of its own weight, takes up a low position and is designed to be brought up to a high position when said sheath is suspended, surfaces of said piston being adapted to act, during this movement, upon the noses of said feeler arms in order to ensure the displacement of said feeler arms towards the retracted position, an abutment co-operating with a shoulder of the piston being formed on the sheath so as to limit the upward movement of said piston with respect to said sheath.

References Cited in the file of this patent

UNITED STATES PATENTS

| | | |
|---|---|---|
| 709,746 | Clopton | Sept 23, 1902 |
| 2,196,314 | Lee | Apr. 9, 1940 |
| 2,559,571 | Shedlovsky | July 3, 1957 |
| 2,949,415 | Stubbs et al. | Aug. 16, 1960 |
| 2,987,691 | Rose | June 6, 1961 |
| 2,999,121 | Mead | Sept. 5, 1961 |